Figure 3:
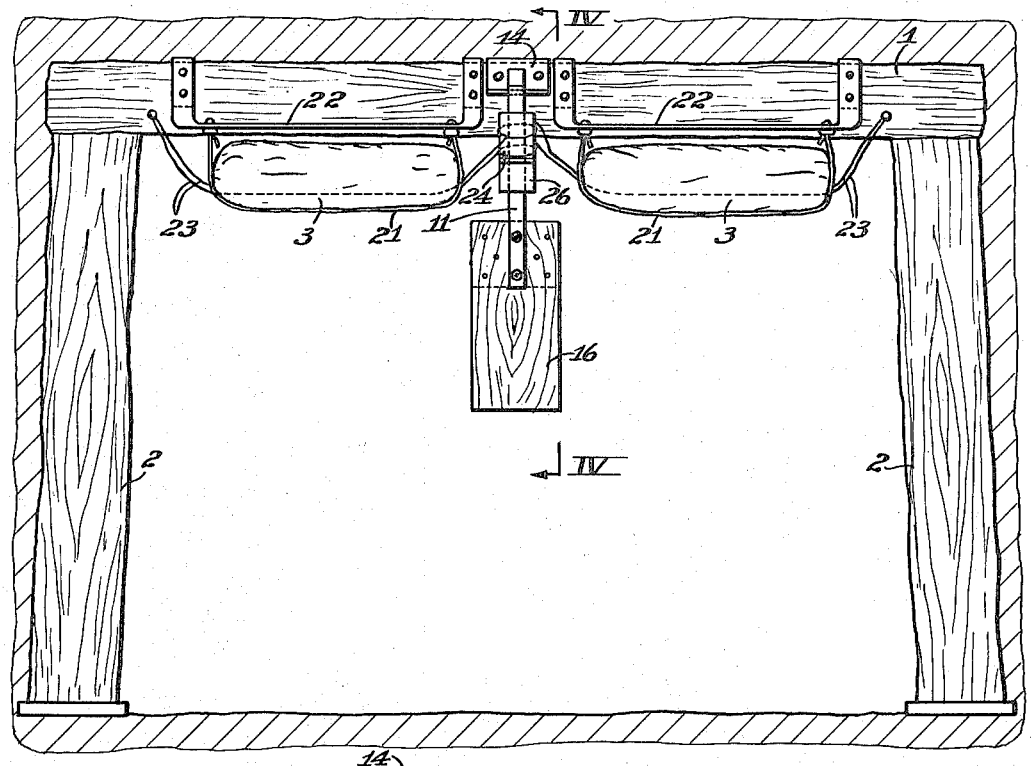

Dec. 14, 1937.   J. E. JONES   2,102,006
ROCK DUST BARRIER
Filed March 23, 1937   3 Sheets-Sheet 1
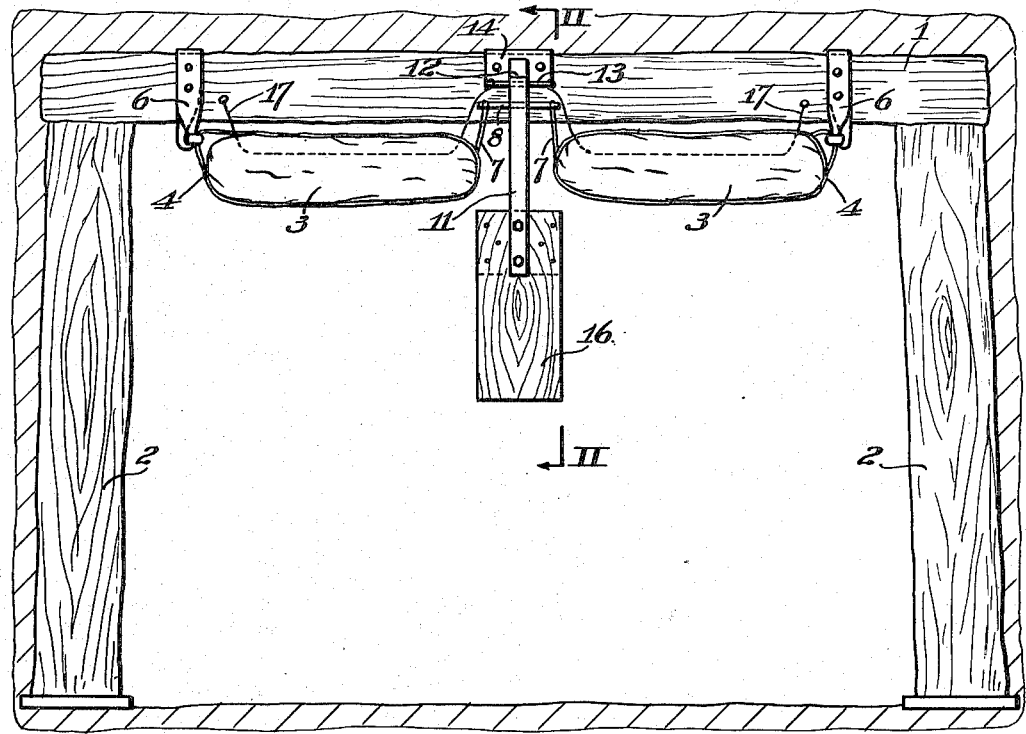
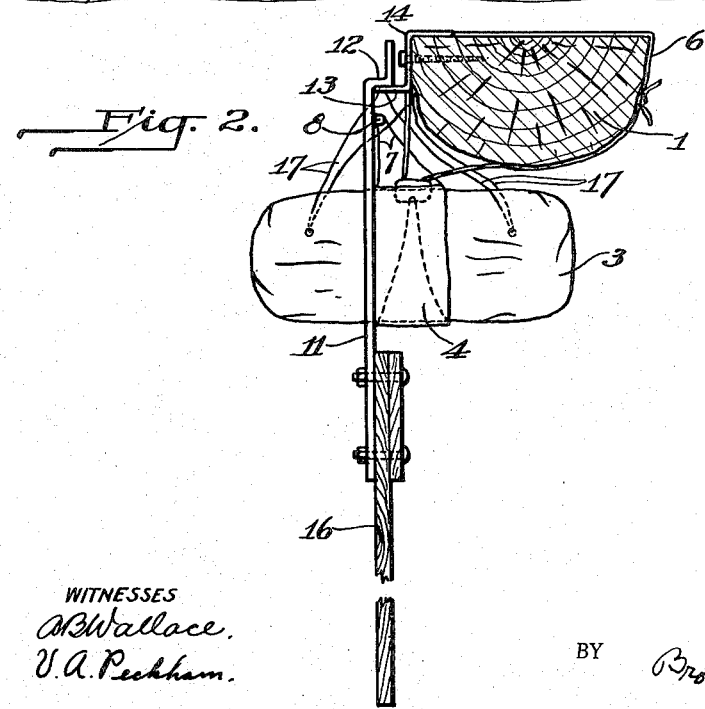

Dec. 14, 1937.    J. E. JONES    2,102,006
ROCK DUST BARRIER
Filed March 23, 1937    3 Sheets-Sheet 2

WITNESSES
A B Wallace
V. A. Peckham

INVENTOR.
John E. Jones
BY Brown, Critchlow & Flick
his ATTORNEYS.

Dec. 14, 1937.   J. E. JONES   2,102,006
ROCK DUST BARRIER
Filed March 23, 1937   3 Sheets-Sheet 3
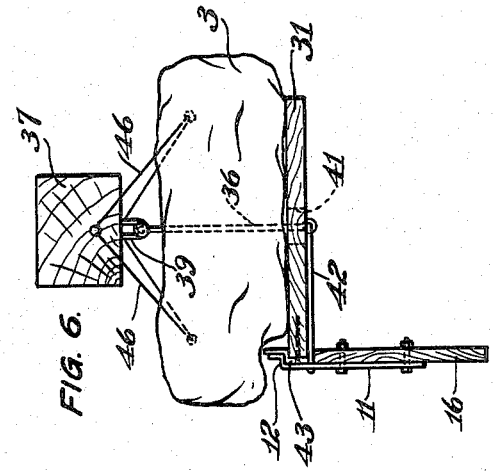
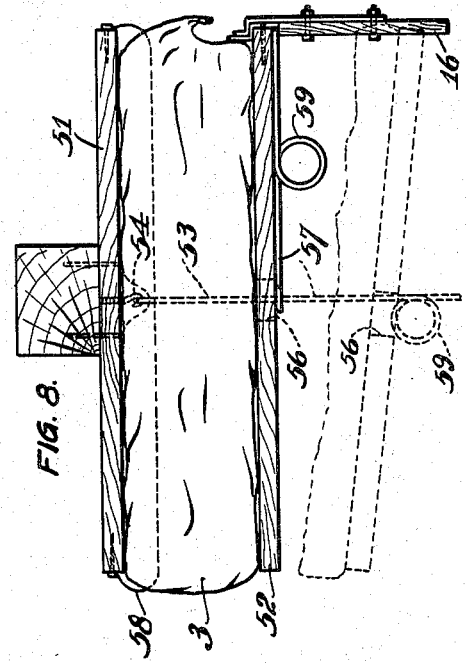
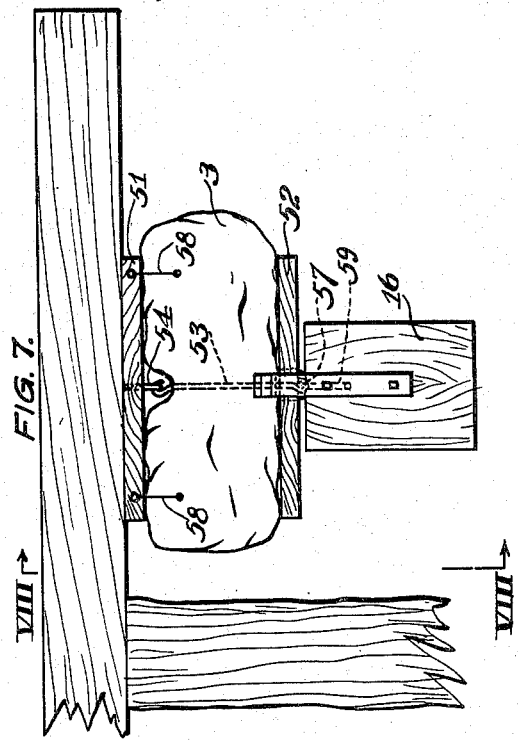
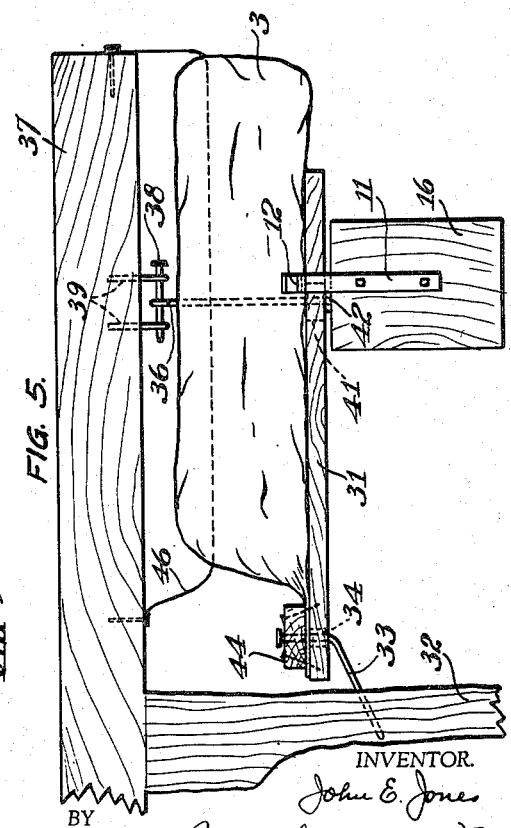
WITNESSES
AB Wallace
V.A. Pickham
INVENTOR.
John E. Jones
BY Brown, Critchlow & Flick
his ATTORNEYS.

Patented Dec. 14, 1937

2,102,006

UNITED STATES PATENT OFFICE 2,102,006

ROCK DUST BARRIER

John E. Jones, Benton, Ill.

Application March 23, 1937, Serial No. 132,546

19 Claims. (Cl. 169—2)

This invention relates to rock dust barriers used for confining and arresting explosions in mines.

As is now well known, rock dust barriers comprise a supply of incombustible rock dust supported in unstable equilibrium over a mine passage, and means adapted to be actuated by the force of the air wave preceding an explosion along the passage for unbalancing the rock dust so that it will fall in a dense cloud across the passage. The cloud of inert rock dust cools the combustion wave constituents sufficiently to cause the wave to be extinguished, and it also forms a curtain or screen through which the heat of the combustion wave does not penetrate sufficiently to cause an explosion on the other side of the screen. It will thus be seen that one of the prime requisites of rock dust barriers is that the dust be kept dry enough to form a dense cloud of finely divided dust particles when released. However, it has been the general practice heretofore to store rock dust in bulk in bins above the mine passages. Even though the bins are protected from water dripping from the roof of the passage, it has not been possible to shield the dust from dampness. If the dust absorbs sufficient moisture to cause it to agglomerate, when dumped it will fall in mass instead of a dense cloud and be practically worthless as a barrier. Consequently, frequent inspection of the barriers is necessary, and replacing of moist dust with dry dust is required. Other disadvantages of bulk dust are the dust and difficulty encountered in handling it, the loss and waste that occur, and the tendency to fall in bulk.

It is among the objects of this invention to provide a rock dust barrier which is simple in construction and easily installed, which is dependable and efficient in operation over indefinite periods of time, which requires substantially no attention, and in which the rock dust is left stored in its original container.

In accordance with this invention rock dust is stored at suitable points along a mine passage in bags, sacks, boxes or other containers, supported above the passage, by which is meant in the upper portion of the passage or in a recess formed in its roof. Means, adapted to be actuated by the air wave preceding an explosion in the passage, is provided for opening each container to discharge its contents into the passage cross-sectional area. This can be done by effecting relative movement of the container and opening means away from each other. In the case of a bag of rock dust it is preferred to associate ripping means with the bag and to so mount them that either the bag or the ripping means falls when an explosion occurs, whereby the bag is ripped or torn open and its contents discharged in a cloud. With such a barrier the rock dust is easily handled without dirt or loss because it remains in its original container from the time it leaves the manufacturing plant until it is released from the container by an explosion in a mine. Also, the construction and upkeep of bins and their associated parts are eliminated. By using a moisture-proof container the dust is protected from dampness, and it therefore will not agglomerate. This does away with the necessity of frequent inspections to see if it requires replacement.

Figure 4:
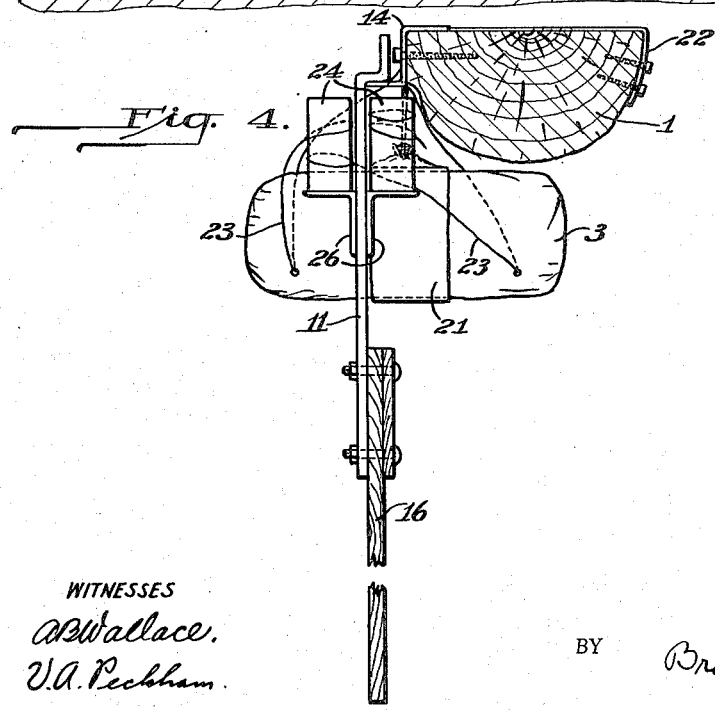

Four embodiments of the invention are illustrated in the accompanying drawings in which Fig. 1 is a view along a mine passage showing one embodiment of the invention; Fig. 2 is an enlarged end view of the trigger member and one of the bags taken on the line II—II of Fig. 1; Figs. 3 and 4 are views similar to Figs. 1 and 2, respectively, of a second embodiment of the invention; Figs. 5 and 6 are views similar to Figs. 1 and 2, respectively, of a third embodiment; Fig. 7 is a view along a mine passage showing a fourth embodiment of the invention; and Fig. 8 is a side view of the bag and supporting member taken on the line VIII—VIII of Fig. 7.

Referring to Figs. 1 and 2 of the drawings, a mine passage is shown shored up by a beam or header 1 supported on its ends by props 2. Disposed below this header and above the passage are two bags 3 of rock dust, the bags preferably being the original containers of the dust. Each bag is suspended from the header by a sling 4 wrapped lengthwise around it and preferably formed of a band of canvas or similar material. The outer end of the sling is connected to the header by a similar strip of material 6 whereby that end of the sling is in effect hinged to the header. The inner end of the sling is supported by a loop 7 of any suitable material which is looped over one end of a horizontal rod 8 forming part of a trigger member.

The trigger comprises a vertical member, such as a bar 11, bent laterally at its upper end to form a shoulder 12 (Fig. 1) that normally rests on the horizontal flange 13 of a plate 14 secured to the header. The lower end of the bar is secured to a vane 16 adapted to be swung in the passage by the air wave preceding an explosion along the passage. Whichever way the vane is swung it causes shoulder 12 to slide off flange 13, whereupon the trigger member drops to the floor of the passage. The two bags of rock dust suspended from opposite ends of rod 8 balance the trigger member and prevent it from tilting transversely of the mine passage. When the trigger is released by an explosion and falls, the inner ends of the bags swing downwardly and outwardly toward the side walls of the passage.

It is also a feature of this invention that as the bags swing downwardly they are torn open so as to discharge their contents in a dense cloud into the passage. For this purpose it is preferred to thread wires 17 lengthwise through the upper portion of each bag, and to secure them in substantially stationary position by connecting their ends to a stationary object. Preferably, the inner end of each wire is connected to trigger plate 14, and the other end is nailed to the header. When the bag falls the wires tear through its upper surface and form openings through which the dust escapes.

In the modification shown in Figs. 3 and 4, each bag 3 is suspended from the header 1 by a sling 21 both ends of which are secured in fixed position to the header in any suitable manner, such as by a strap 22. A vane 16, trigger bar 11 and trigger plate 14 are disposed between the inner ends of the bags in the same manner as described in connection with Fig. 1. However, in this embodiment the rip wires 23 that extend through the lower portions of the bags and have their outer ends nailed to the header, have their inner ends connected to weights 24 which normally rest on brackets 26 attached to the opposite sides of trigger bar 11, as shown in Fig. 4. Both wires of each bag are attached to the same weight so that the two weights will swing outwardly away from each other when they fall. When the wave preceding an explosion along the mine passage swings vane 16 and thereby causes the trigger to drop, the weights fall off the trigger brackets and carry the free ends of the rip wires down with them. The weights are sufficiently heavy to pull the wires through the bottoms of the bags, whereby the bags are ripped open and their contents released. It will be observed that the operation of this barrier is just the reverse of the one first described in which the wires were stationary and the bags swung downwardly.

In the embodiment shown in Figs. 5 and 6, a bag support, preferably in the form of a wooden plank 31, is hinged at one end to the upper portion of a mine passage prop 32. A simple but effective hinge is formed by driving a nail 33 into the prop with its outermost end portion projecting straight up through an enlarged hole 34 in the plank so that the plank can swing in a vertical plane on the nail. The plank is normally supported in substantially horizontal position by a link and lever device associated with a trigger member. Accordingly, a vertical link 36 is suspended from a header 37 in any suitable manner, such as by a nail 38 extending through a loop in the upper end of the link and supported by staples 39 driven up into the header. The lower end of the link passes through an enlarged opening 41 in the plank and is provided with a loop in which the inner end of a lever 42 is pivoted. This lever extends outwardly beneath the plank, and its outer end normally rests on top of the vane 16 connected to the lower end of trigger bar 11. Shoulder 12 at the upper end of the trigger bar preferably rests on a metal trigger catch 43 attached to one edge of the plank, as shown in Fig. 6. The trigger catch insures a smooth horizontal supporting surface for the trigger bar. While lever 42 is supported by the trigger member, plank 31 is supported by the lever.

A bag 3 of rock dust is mounted on the plank with one end of the bag secured to the hinge end of the plank such as by clamping them together by means of a strip of wood 44 nailed to the plank. Horizontally spaced rip wires 46 extend longitudinally through the upper portion of the bag with their opposite ends nailed to the header. When the vane is swung in the passage by the air wave preceding an explosion therein, the trigger bar shoulder is disengaged from the trigger catch and the vane falls. This releases the outer end of lever 42 which immediately swings downwardly and releases the free end of the plank. As the plank and bag swing downwardly and outwardly, the lever passes through plank opening 41 and the bag through which link 36 extended. The upper portion of the bag is ripped open by the rip wires as the bag falls, and its contents are thereby discharged into the mine passage.

In the modification shown in Figs. 7 and 8 a rigid member, such as a plank 51, is secured to the bottom of header 37 above it and extends transversely thereof, if the mine cross beam is not properly located for this purpose. Disposed below this plank or beam is another plank 52 which is normally held in substantially horizontal position by a link and lever device similar to the one shown in Figs. 5 and 6. That is, link 53 is suspended from its upper end from a hook 54 projecting from the center of upper plank 51. The lower end of this link passes through an enlarged opening 56 in lower plank 52 and is pivotally connected to one end of a lever 57. The lever extends outwardly beneath the plank to one end of it and is normally supported by trigger vane 16 in the same manner as the lever previously described.

A bag 3 of rock dust is supported by the lower plank which is held steady in horizontal position because the bag also engages the upper plank or beam, or may even be snug against the roof of the passage. Rip wires 58 extend through the upper portion of the bag and have their ends nailed to the ends of the upper plank, beam or plugs in the roof. When vane 16 is actuated by a mine explosion the outer end of lever 57 is released, whereupon the lever swings down into vertical position and the bottom plank and the bag drop. However, their downward movement is arrested by a loop 59 formed in the lever, the loop being larger than opening 56 in the plank. As the bag falls its upper portion is ripped open by the rip wires, and the bag spreads apart to discharge its contents into the mine passage, the sudden jerk causing the dust to spread into a cloud.

In a rock dust barrier constructed in accordance with any of the above-described embodiments the rock dust is stored in its original container or bag until released by a mine explosion. The barrier is relatively simple in construction and operation and is not subject to getting out of order. Regardless of how long a time elapses before an explosion occurs, and it is hoped that none will ever occur, the barrier can be depended upon to discharge a dense cloud of rock dust into the mine passage across the path of the combustion wave. In especially damp mines, or mines in which water drips from the passage roofs, it is desirable to specify water-proof bags at time of purchase or to treat the bags to render them water-proof. Furthermore, in the event of a mine fire, rock dust with which to fight the fire is always at hand, readily obtainable, in good condition and in a container that can easily be carried to the fire. Another advantage is that as sections of a mine are worked out and closed or sealed so that there is no longer any need for rock dust barriers in such sections, the bags of rock dust and their supporting apparatus can easily be removed and installed again in open sections of the mine.

According to the provisions of the Patent Statutes, I have explained the principle and mode of operation of my invention, and have illustrated and described what I now consider to be its best embodiment. However, I desire to have it understood that, within the scope of the appended claims, the invention may be practiced otherwise than as specifically illustrated and described.

I claim:

1. A rock dust barrier comprising a bag member containing rock dust and disposed above a mine passage, a bag-opening member associated with the bag member, and means adapted to be actuated by the force of an explosion in said passage for releasing one of said members to effect relative movement of said members away from each other whereby the bag member is opened by said opening member and its contents discharged.

2. A rock dust barrier comprising a bag member containing rock dust and disposed above a mine passage, a bag-opening member associated with the bag member, a support for one of said members adapted to be released by the force of an explosion in said passage for effecting relative vertical movement of said members away from each other whereby the bag member is opened by said opening member and its contents discharged.

3. A rock dust barrier comprising a bag member containing rock dust and disposed above a mine passage, a bag-opening member associated with the bag member, and means adapted to be actuated by the force of an explosion in said passage for causing one of said members to fall whereby the bag member is opened by said opening member and its contents discharged.

4. A rock dust barrier comprising a bag of rock dust, means supporting the bag above a mine passage and adapted to move vertically when released, bag-opening means associated with the bag and secured in substantially stationary position, and means adapted to be actuated by the force of an explosion in said passage for releasing said supporting means whereby the bag and supporting means move vertically and the bag is opened by said opening means.

5. A rock dust barrier comprising a bag of rock dust, means supporting the bag above a mine passage, ripping means associated with the bag and secured in substantially stationary position, and means adapted to be actuated by the force of an explosion in said passage for releasing said supporting means whereby the bag falls and is ripped open by said stationary ripping means.

6. A rock dust barrier comprising a bag of rock dust supported above a mine passage, ripping means associated with the bag and adapted to move vertically when released, and means adapted to be actuated by the force of an explosion in said passage for releasing said ripping means whereby the bag is ripped open and its contents discharged.

7. A rock dust barrier comprising a bag of rock dust supported above a mine passage, ripping means associated with the bag, and means adapted to be actuated by the force of an explosion in said passage for causing the ripping means to fall whereby it rips open the bag to discharge its contents.

8. A rock dust barrier comprising a bag of rock dust disposed above a mine passage with one end hinged in substantially fixed position, means releasably supporting the opposite end of the bag, bag-opening means associated with said bag and secured in substantially stationary position, and means adapted to be actuated by the force of an explosion within said passage for releasing said supporting means whereby the bag swings downwardly and is opened by said opening means.

9. A rock dust barrier comprising a supporting member, means hinging one end of the member above a mine passage, means releasably supporting said member in substantially horizontal position, a bag of rock dust mounted on said member, ripping means associated with said bag and secured in substantially stationary position, and means adapted to be actuated by the force of an explosion in said passage for releasing said bag-supporting member whereby said member and bag swing downwardly and the bag is ripped open by said ripping means.

10. A rock dust barrier comprising a supporting member, means hinging one end of the member above a mine passage, a trigger member mounted in said passage and adapted to be released by the force of an explosion in the passage, means associated with said support and trigger member for supporting said support in substantially horizontal position, a bag of rock dust mounted on said support, said support swinging downwardly when the trigger member is released, and bag-opening means associated with said bag and secured above said passage.

11. A rock dust barrier comprising a substantially horizontal rigid support hinged at one end above a mine passage and provided with a vertical opening, a vertical link supported at its upper end above said passage and extending downwardly through said opening, a trigger member associated with said support and adapted to be released by the force of an explosion in the passage, a substantially horizontal lever pivoted to the lower end of said link with its outer end supported by said trigger whereby said support is releasably supported, a bag of rock dust mounted on said support, and a wire extending substantially horizontally through said bag with its ends secured above said passage.

12. A rock dust barrier comprising a substantially horizontal rigid support hinged at one end above a mine passage and provided with a vertical opening, a vertical link supported at its upper end above said passage and extending downwardly through said opening, a vertical member having a laterally projecting portion at its upper end resting on the edge portion of said support, a vane connected to the lower end of said vertical member, a lever pivoted to the lower end of said link and extending outwardly below said support with its outer end supported by said vane, a bag of rock dust mounted on said support, and a wire extending substantially horizontally through said bag with its ends secured above said passage.

13. A rock dust barrier comprising a bag of rock dust supported above a mine passage, ripping means associated with the bag, means releasably supporting said ripping means, and means adapted to be actuated by the force of an explosion in said passage for releasing said supporting means whereby said ripping means falls and rips open said bag.

14. A rock dust barrier comprising a bag of rock dust supported above a mine passage, a trigger member mounted in said passage and adapted to be released by the force of an explosion in the passage, and a rip member extending through said bag with one end secured above said passage and the other end supported by said trigger member.

15. A rock dust barrier comprising a bag of rock dust supported above a mine passage, a trigger member mounted in said passage and adapted to be released by the force of an explosion in the passage, a rip wire extending substantially horizontally through said bag with one of its ends secured above said passage, and a weight attached to the opposite end of said wire and supported by said trigger member.

16. A rock dust barrier comprising a bag of rock dust supported above a mine passage, a rip wire extending substantially horizontally through said bag with one of its ends secured above said passage at one end of the bag, a substantially horizontal support mounted above said passage at the opposite end of the bag, a vertical member having a laterally projecting portion at its upper end resting on said support, a bracket attached to said member, a weight connected to the free end of said wire and mounted on said bracket, and a vane connected to the lower end of said vertical member.

17. A rock dust barrier comprising a rigid support, means releasably supporting said support in substantially horizontal position above a mine passage, a bag of rock dust mounted on said support, ripping means associated with said bag and secured in substantially stationary position, means adapted to be actuated by the force of an explosion in said passage for releasing said bag support whereby said support and bag drop and the bag is ripped open by said ripping means, and means for arresting the fall of said support.

18. A rock dust barrier comprising a substantially horizontal rigid support disposed above a mine passage and provided with a vertical opening, a vertical link supported at its upper end above said passage and extending downwardly through said opening, a trigger member associated with said support and adapted to be released by the force of an explosion in the passage, a substantially horizontal lever pivoted to the lower end of said link with its outer end supported by said trigger whereby said support is releasably supported, means for arresting the fall of said support when released, a bag of rock dust mounted on said support, and a wire extending substantially horizontally through said bag with its ends secured above said passage.

19. A rock dust barrier comprising a substantially horizontal rigid support disposed above a mine passage and provided with a vertical opening, a vertical link supported at its upper end above said passage and extending downwardly through said opening, a vertical member having a laterally projecting portion at its upper end resting on the edge portion of said support, a vane connected to the lower end of said vertical member, a lever pivoted to the lower end of said link and extending outwardly below said support with its outer end supported by said vane, a bag of rock dust mounted on said support, and a wire extending substantially horizontally through said bag with its ends secured above said passage, said lever being provided with a laterally projecting portion adapted to arrest the fall of said support when the latter is released.

JOHN E. JONES.